UNITED STATES PATENT OFFICE 2,408,970

BUTADIENE PURIFICATION

Thomas F. Doumani, Long Beach, and Davis A. Skinner, Compton, Calif., assignors to Union Oil Company of California, Los Angeles, Calif., a corporation of California No Drawing. Application December 16, 1943, Serial No. 514,546

5 Claims. (Cl. 260—681.5)

This invention relates to the production of butadiene, and especially to a method for purification of hydrocarbon mixtures containing butadiene and acetylene type hydrocarbons of the same boiling range, whereby the acetylenes are removed by a selective hydration process, without appreciable effect on the butadiene.

Butadiene has attained vital importance in recent years as an ingredient of synthetic rubber, and as a raw material for many other uses. For many of these uses, such as in synthetic rubber manufacture, it is necessary or at least highly desirable that the butadiene be free from contamination with other hydrocarbons, particularly acetylenic hydrocarbons. Since butadiene produced by pyrolysis of other organic compounds, particularly hydrocarbon mixtures such as petroleum fractions, generally contains large amounts of such contaminating hydrocarbons, the purification of butadiene presents a serious problem, and many processes have been devised as attempts to solve it. In most of these processes, distillation is the first step; but by this means, unless elaborate super-fractionation is employed, the product obtained is a so-called $C_4$ cut, which contains in addition to butadiene, other hydrocarbons or azeotropic mixtures which boil in the same range, including isobutane, normal butane, isobutene, the normal butenes, and methyl, ethyl, and vinyl acetylenes. Azeotropic distillation, extractive distillation, and solvent extraction processes have been employed to separate the butanes, and even the butenes from this mixture, but in general the acetylenes, or at least an appreciable proportion of them, remain with the butadiene, since their chemical characteristics are quite similar.

We have now discovered a method whereby acetylenes in mixtures with butadiene may be quantitatively removed without appreciable loss of butadiene. This method not only effects purification of the butadiene but also converts the acetylenes removed to by-products of great value as solvents, perfumes, chemicals, etc. It is an object of our invention therefore, to provide a method for separating acetylenes from butadiene. Further objects are to provide methods for separating acetylenes from other diolefins or from other unsaturated hydrocarbons such as monoolefins and for converting acetylenes to valuable aldehydes, ketones, and alcohols.

The above objects are accomplished by treating a hydrocarbon mixture containing acetylenes and butadiene or other unsaturated hydrocarbons with water in the presence of a catalyst, whereby the acetylenes are selectively converted to oxygen-containing compounds, while the butadiene or other unsaturated hydrocarbons are substantially unaffected. The oxygen-containing compounds are then separated from the unreacted unsaturated hydrocarbons by conventional methods such as distillation, solvent extraction, azeotropic distillation, or the like.

As a specific example of our invention, the following process was carried out:

A naphthenic California crude gasoline fraction was cracked by vaporizing it and contacting the vapors with hot flue gases at substantially atmospheric pressure under such conditions that an average temperature of about 1500° F. was maintained for a period of about 0.02 second. The $C_4$ fraction recovered from the product by absorption and distillation contained about 54% butadiene, 5% acetylenes (largely vinyl acetylene, but also methyl and ethyl acetylenes), 3% butanes, and the remaining approximately 38% butenes, all per cents being molal.

The above $C_4$ fraction was passed through a tube containing 100 ml. of catalyst at a rate of 4 liters (atmospheric temperature and pressure) per hour, together with water vapor introduced at a rate of 25 grams per hour. The temperature of the catalyst bed was held at 300° C., and the total pressure was substantially atmospheric. The product gas after removal by condensation of substantially all of its oxygenated organic compounds and water, was found to contain less than about 0.01% of acetylenes, while the butadiene and other unsaturated hydrocarbons (butenes) were substantially unaffected. The bulk of the oxygenated organic compounds produced by the reaction of the acetylenes with the water were recovered as an oily upper layer in the liquid condensate, although a small amount dissolved in the lower aqueous layer of condensate. The oily upper layer contained a small amount of hydrocarbons, apparently dimer and higher polymers of butadiene, but was predominantly composed of oxygenated compounds, principally aldehydes and ketones, including methyl vinyl ketone, methyl ethyl ketone, acetone, crotonaldehyde, butyraldehyde and propionaldehyde.

The catalyst employed in the above example was a 12 to 20 mesh siliceous solid phosphoric acid commercially available as a polymerization catalyst. It is known as Polymer Catalyst No 2, and is marketed by the Universal Oil Products Company of Chicago, Illinois. Other catalysts may be employed however, such as phosphoric acid alone or partially neutralized, which may or may not be deposited on carriers such as siliceous materials, kieselguhr, clay, and the like. Oxides or halides of heavy metals such as those of groups I and II such as mercury, silver, copper, cadmium, zinc, magnesium and the like, and mixtures of easily reducible oxides such as those of silver and mercury with difficultly reducible oxides such as those of zinc, copper and the like, are also effective. The contact time employed in the process will vary with the activity of the catalyst used, being shorter for the more active catalysts.

The process of this invention may be carried out with catalysts such as the above, at temperatures between about 150° C. and 700° C., although temperatures between about 300° C. and about 500° C. are preferred. The total or overall pressure may be as high as about 5 atmospheres, but the partial pressure of the unsaturated hydrocarbons should be below about 300 mm. of mercury and preferably below 100 mm. of mercury. In the above example it may be noted that the total pressure was substantially one atmosphere and the partial pressure of the unsaturated hydrocarbons (butadiene plus butenes plus acetylenes) was about 0.11 atmosphere or about 84 mm. of mercury. Where the unsaturated hydrocarbons include butadiene or other diolefins, it is desirable that the partial pressure of the diolefins be below about 50 mm. of mercury. In the above example, the butadiene partial pressure was $84 \times 54/97 = 47$ mm.

The low partial pressures described above are preferably attained by dilution with steam, but dilution with other inert gases such as flue gases, nitrogen, or saturated hydrocarbons may also be made, providing that there is at least one mol of water present to react with every mol of acetylenic hydrocarbon present. It is desirable, however, to have the molal ratio of water to acetylenes 100 or more to 1. A ratio of water to total unsaturates in the region of about 5 to 1 to 15 to 1 appears to be desirable.

The invention is not confined to the treatment of $C_4$ fractions containing butadiene, although this is a preferred embodiment. Propylene and ethylene fractions may also be freed of methyl acetylene and acetylene by this method; $C_5$ fractions containing mono-olefins and diolefins such as cyclopentadiene, isoprene, and the like may be freed of diacetylene, dimethyl acetylene, isopropyl and isopropenyl acetylenes, and the like; or higher molecular weight fractions may also be freed of acetylenes. By the term acetylenes it is meant to include any hydrocarbon compound containing at least one triple bond. The reaction may be carried out in the liquid phase, especially with the higher molecular weight fractions, but is preferably carried out in the vapor phase. The reaction may also be carried out in the absence of other unsaturated hydrocarbon, but one of its most unusual aspects is that it will take place selectively with the acetylenes even in the presence of other hydrocarbons in molal excess over the acetylenes, i. e., in hydrocarbon mixtures containing acetylenes in admixture with larger amounts of other unsaturated hydrocarbons, especially when the other unsaturated hydrocarbons include diolefins. It appears that either the acetylenes or their hydration products act as inhibitors for the hydration of the butadiene or other unsaturated hydrocarbons.

The oxygenated organic compounds formed in the reaction are useful as chemicals, solvents, perfumes, etc., as mentioned earlier, and may also be used as azeotrope formers and as selective solvents for the separation, for example, of the butanes and butenes from the butadiene and acetylenes of the $C_4$ cut. They are also useful as solvents for the dewaxing of oil and the deoiling of wax, and for many other purposes.

Other modifications of this invention which would occur to one skilled in the art are to be included in the scope of this invention as defined in the following claims.

We claim:

1. A process for the purification of diolefins which are contaminated by the presence of relatively small proportions of acetylenes of approximately the same boiling points, which comprises reacting a hydrocarbon mixture containing said acetylenes and diolefins with water in the vapor phase in the presence of a catalyst at a temperature above about 300° C. and a partial pressure of diolefins below about 100 mm. of mercury, whereby the acetylenes are converted to oxygenated derivatives, and the diolefins are substantially unchanged.

2. A process for the purification of butadiene which is contaminated with relatively small proportions of acetylenes of similar boiling point, which comprises reacting a hydrocarbon mixture containing said acetylenes and butadiene with water in the vapor phase in the presence of a catalyst at a temperature above about 300° C. and a partial pressure of diolefins below about 100 mm. of mercury, whereby the acetylenes are converted to oxygenated derivatives, and the butadiene is substantially unchanged.

3. A process according to claim 2 in which the catalyst is a siliceous solid phosphoric acid catalyst.

4. A process according to claim 2 in which the catalyst is an oxide of a heavy metal of groups 1 and 2 of the periodic system.

5. A process according to claim 2 in which the catalyst is a halide of a heavy metal of groups 1 and 2 of the periodic system.

THOMAS F. DOUMANI.
DAVIS A. SKINNER.